June 23, 1925. 1,543,448
H. E. MAYNARD
VEHICLE BRAKE
Filed April 20, 1923 3 Sheets-Sheet 1
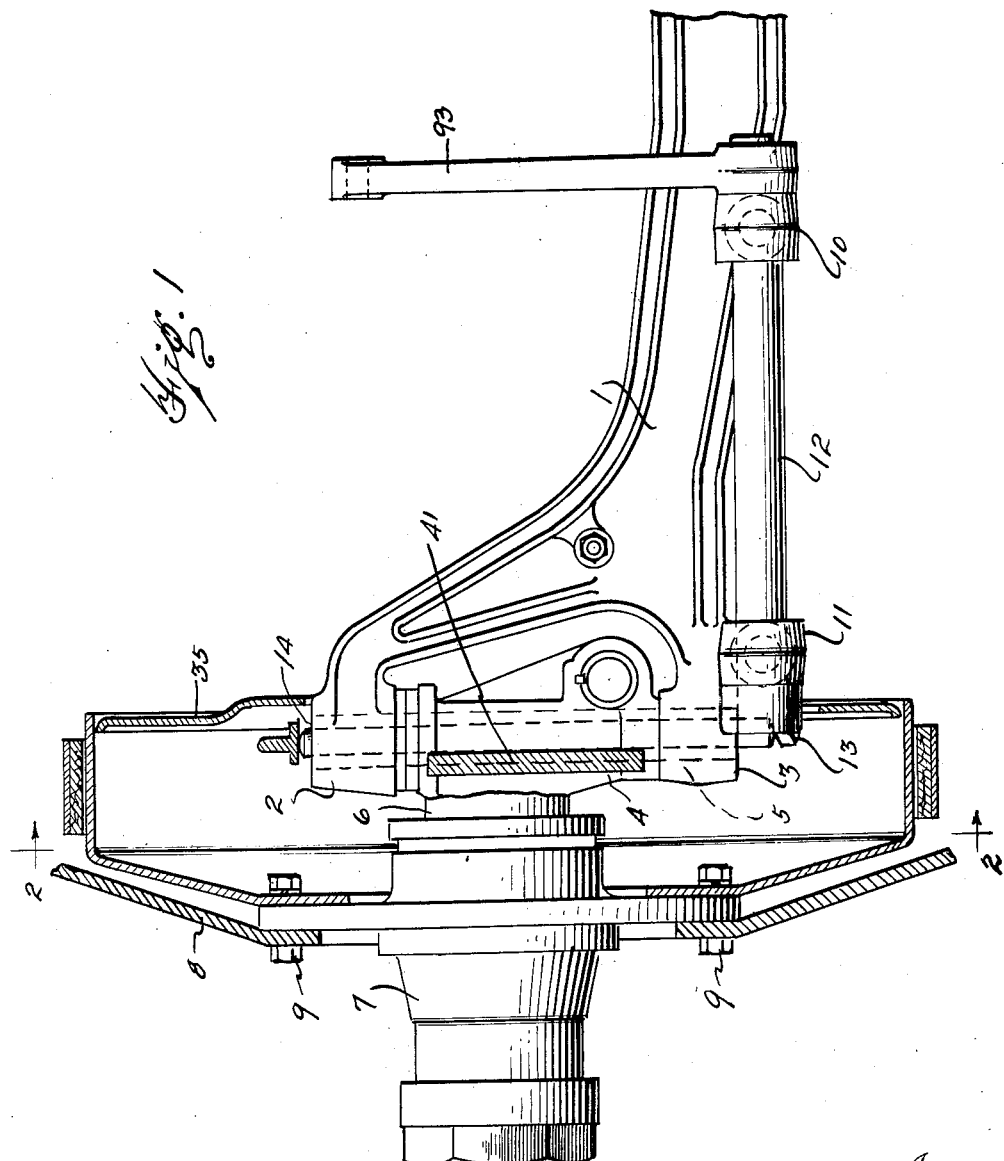
Inventor
Howard E. Maynard
By King Harness
Attorney

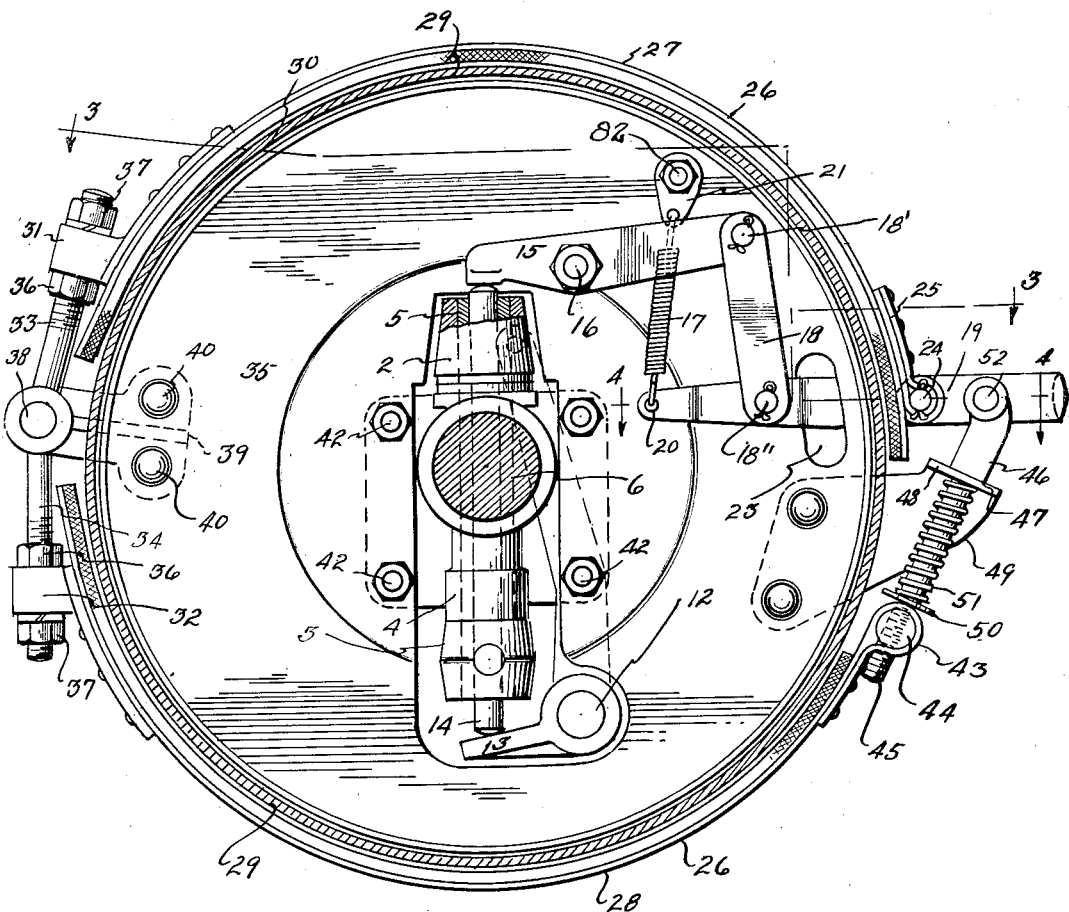

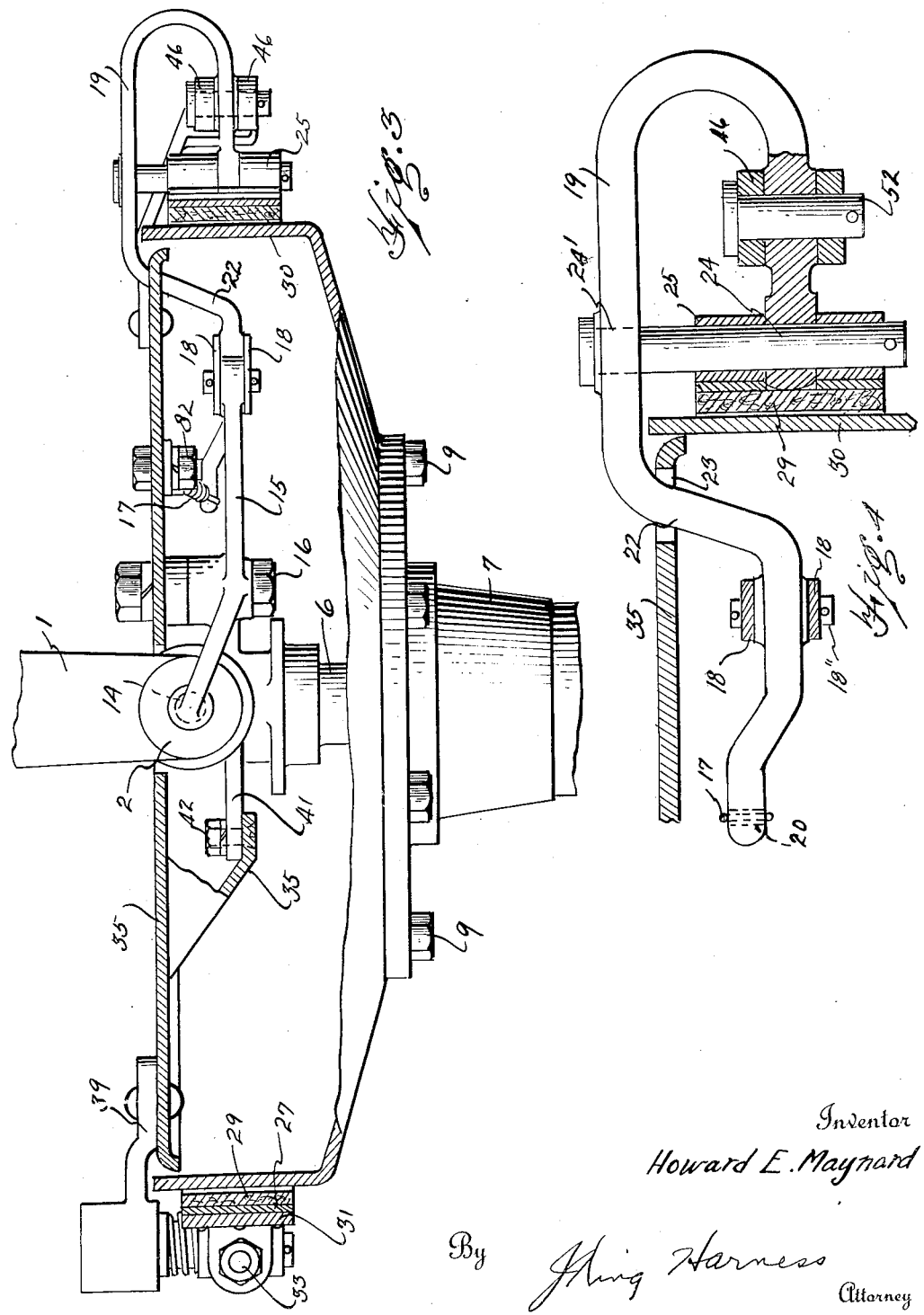

Patented June 23, 1925.

1,543,448

UNITED STATES PATENT OFFICE.

HOWARD E. MAYNARD, OF DETROIT, MICHIGAN, ASSIGNOR TO MAXWELL MOTOR CORPORATION, OF HIGHLAND PARK, MICHIGAN, A CORPORATION OF WEST VIRGINIA.

VEHICLE BRAKE.

Application filed April 20, 1923. Serial No. 633,381.

*To all whom it may concern:*

Be it known that I, HOWARD E. MAYNARD, a citizen of the United States of America, residing at Detroit, in the county of Wayne and State of Michigan, have invented certain new and useful Improvements in Vehicle Brakes, of which the following is a specification, reference being had to the accompanying drawings.

My invention relates to vehicle brakes and more particularly to a brake adapted for attachment to the front wheels of a vehicle.

It is a primary object of my invention to provide such a brake adapted to operate easily and efficiently at all times and at all positions of the front wheels of the vehicle to the front axle.

It is a further object of my invention to provide a front wheel, external brake, mounted on the front wheels in the center line of the tread of the wheels, and adapted to be actuated by a pin passing through the king pin of the axle, said king pin being also in the center line of the tread of the wheels.

With these and other objects in view, my invention consists in the arrangement, combination and construction of the various parts of my improved device as described in the specification, claimed in my claims and shown in the accompanying drawings, in which:

Fig. 1 is a rear view of my device attached to the front wheel of a motor vehicle, some parts being shown in section.

Fig. 2 is a view taken on line 2—2 of Fig. 1.

Fig. 3 is a view taken on line 3—3 of Fig. 2.

Fig. 4 is an enlarged view taken on line 4—4 of Fig. 2.

Referring more particularly to the drawings, 1 represents the front axle of a motor vehicle having arms 2 and 3 thereon between which a steering knuckle 4 is adapted to set and be held in pivotal connection therewith by means of a king pin 5. The steering knuckle 4 has an integral spindle 6 thereon adapted to support the hub 7 and the disc wheel 8 attached to said hub by bolts 9.

It will be noted that all of the above construction is more or less conventional with the exception that the king pin 5 is hollow, and is placed in substantially the center of the tread by means of the disc wheel 8 being convex.

On the axle 1, I have provided bearings 10 and 11 in which is mounted a shaft 12 adapted to be rotated by an arm 93 said arm 93 being operated by a foot pedal or lever (not shown) in juxtaposition to the driver's seat of the vehicle.

Mounted on the opposite end of the shaft 12 is a lifting cam or finger 13, adapted to engage the lower end of the vertical shaft 14, said shaft being slidable in the hollow king pin 5.

Adjacent the top of the shaft 14 is a member 15 best shown in Figs. 2 and 3, pivoted as at 16 to the circular plate 35. One end of the member 15 is adapted to rest on top of the shaft 14 and is held in engagement therewith by means of a tension spring 17. The opposite end of the member 15 is pivotally connected to a pair of links 18 as at 18'. The other end of said links being pivoted to a bar 19 as at 18''.

The bar 19 is shaped substantially as shown in Figs. 3 and 4. The end nearest the king pin being provided with a hole 20 adapted to receive one end of the tension spring 17. The opposite end of the tension spring 17 is secured to a clip 21 said clip being fastened to plate 35 by means of a bolt 82. Bar 19 is bent inwardly as at 22 passing through an elongated slot 23 formed in the plate 35. The end farthest from the king pin 5 is bent in a U shaped manner, the end being pivotally mounted on a rod 24 carried by a bracket 25, said bracket 25 being riveted to the outer face of the brake band 26.

The brake band 26 is divided into two sections having an upper part 27 and a lower part 28, both of which are provided with the usual brake lining 29, said brake lining being adapted for engagement with the brake drum 30 upon operation of the brake pedal or lever as will be hereinafter described.

Situated forwardly of the brake band portions 27 and 28 and secured thereto, adjacent the ends, are brackets 31 and 32 and loosely mounted thereon are adjusted rods 33 and 34, said rods 33 and 34 being locked in brackets 31 and 32 by means of nuts 36 and lock nuts 37. The opposite ends are pivotally mounted on a shaft 38 carried by a bracket 39, said bracket being fastened to the circular plate 35 by means of rivets 40.

Adjusting rods 33 and 34 are used to retain the spaced relationship between the brake lining 29 and the brake drum 30.

The plate 35 is carried by a plate 41, said plate 41 being integral with the spindle 4. Plates 35 and 41 are held together by means of bolts 42.

I have also provided a bracket or loop 43 formed on the end of the brake band 28 at the end remote from the bracket 32. Said loop 43 carries a pin 44 having a tapped hole therein. Threaded in said hole is a rod 45, having its upper end formed with a yoke portion 46 and a shoulder 47, the shoulder 47 being adapted to rest on a flanged portion 48 of a bracket 49. Said bracket 49 being carried by the circular plate 35.

Loosely mounted on a rod 45 is a washer 50. A compression spring 51 is mounted on a rod 45, the upper end bearing against a flange 48 and the lower end against the washer 50. It will be readily seen that the compression of the spring 51 may be adjusted to any desired strength by means of the adjusting rod 45.

The upper end of the yoke portion 46 straddles the bar 19 and is pivotally mounted thereto by means of a pin 52.

It will also be noted that the rod 24 extends past the bracket 25 and through the opposite side of the bar 19 as at 24'. This provides extra rigidity to the bar 19 and prevents any twisting motion that might take place upon the operation of the brakes.

It will now be readily seen that upon the operation of the brake pedal, the arm 93 will be rocked rearwardly, rocking the shaft 12 in the same direction, and imparting a lifting motion to the cam or finger 13. This will cause an upward motion of the rod 14 and at the same time will cause a downward motion of the link 18 and the bar 19. The bar 19 being fixedly pivoted to the yoke 46 and movably pivoted to the rod 24. A downward motion of the bar 19 will cause a like motion to the upper half of the brake band 26 and consequently a braking action will be imparted to the front wheels upon engagement of the brake lining 29 to the brake drum 30.

A still further movement of the brake pedal will cause the rod 24 to become the fixed pivot and 52 the movable pivot, since the pivot 24 is locked against any further downward movement. The pivot 52 will be moved upward against the compression of the spring 51 until the brake lining 29 on the lower half of the brake band comes into engagement with the outer face of the brake drum 30 causing a further braking action. Upon releasing the brake pedal, the brake bands 27 and 28 will resume their normal position by reason of the springs 17 and 51.

It will also be clearly seen that the brakes may be readily operated at any position which the front wheels may assume to the vehicle, since the finger 13 will always retain its same position in relation to the pin 14.

It is obvious that various changes may be made in the arrangement, combination and construction of the various parts of my improved device without departing from the spirit of my invention and it is my intention to cover by my claims such changes as may be reasonably inclined within the scope thereof.

What I claim is:

In combination, a wheel having a spindle connected with an axle by means of a pin so as to make said wheel freely movable, a second pin extending through said first pin and adapted to be moved therein irrespective of the position of the wheel, a brake drum on said wheel, a two piece brake band around said drum, one end of each band being secured to a member mounted adjacent said drum and the other end of each being connected at different points to a somewhat U shaped member, a spring on the latter end of one of said members, whereby movement of said U shaped member will cause one of said bands to tighten on the drum while the spring on the other said band will be compressed until the first said band is tightened on said drum, when the second said band will be caused to tighten on said drum, and connections between said second pin and said U shaped member, whereby movement of the former will cause movement of the latter.

HOWARD E. MAYNARD.